US012370570B2

(12) United States Patent
Yamakado et al.

(10) Patent No.: US 12,370,570 B2
(45) Date of Patent: Jul. 29, 2025

(54) SEALANT FORMING NOZZLE, SEALANT FORMING APPARATUS, AND SEALANT FORMING METHOD

(71) Applicant: MITSUBISHI HEAVY INDUSTRIES, LTD., Tokyo (JP)

(72) Inventors: Taizo Yamakado, Tokyo (JP); Tsuyoshi Matsusaka, Tokyo (JP); Hiroki Akamatsu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/808,079

(22) Filed: Aug. 19, 2024

(65) Prior Publication Data

US 2025/0065361 A1 Feb. 27, 2025

(30) Foreign Application Priority Data

Aug. 23, 2023 (JP) ................................ 2023-135671

(51) Int. Cl.
*B05C 17/005* (2006.01)
*B05C 5/00* (2006.01)
*B05C 5/02* (2006.01)

(52) U.S. Cl.
CPC ........ *B05C 17/00516* (2013.01); *B05C 5/004* (2013.01); *B05C 5/0208* (2013.01); *B05C 5/0216* (2013.01)

(58) Field of Classification Search
CPC . B05C 17/00516; B05C 5/004; B05C 5/0208; B05C 5/0216
USPC .......................................................... 401/265
See application file for complete search history.

(56) References Cited

U.S. PATENT DOCUMENTS 9,718,088 B2 * 8/2017 Nawata ............ B05C 17/00516
2015/0217326 A1 8/2015 Nawata et al.

FOREIGN PATENT DOCUMENTS

EP 3332878 B1 * 7/2020 ............... B05B 9/03
JP 2014-054606 A 3/2014

* cited by examiner

*Primary Examiner* — Jennifer C Chiang
(74) *Attorney, Agent, or Firm* — HAUPTMAN HAM, LLP

(57) ABSTRACT

A sealant forming nozzle is a sealant forming nozzle that forms sealant by being moved along a target surface, and includes: a main body portion covering the target surface and forming a cavity, the cavity including an opening that opens only toward a rear side in a movement direction and a closing surface provided on a front side in the movement direction; and a discharge hole that is formed in the main body portion and guides a sealing material supplied from outside into the cavity. The closing surface extends so as to approach the target surface toward the front side in the movement direction in a cross-sectional view in a direction orthogonal to the movement direction and along the target surface.

8 Claims, 9 Drawing Sheets

SEALANT FORMING NOZZLE, SEALANT FORMING APPARATUS, AND SEALANT FORMING METHOD

CROSS-REFERENCE TO RELATED APPLICATIONS

This application claims the benefit of priority to Japanese Patent Application Number 2023-135671 filed on Aug. 23, 2023. The entire contents of the above-identified application are hereby incorporated by reference.

TECHNICAL FIELD

The present disclosure relates to a sealant forming nozzle, a sealant forming apparatus, and a sealant forming method.

RELATED ART

To prevent leakage of water, fuel, or the like from a joint portion of a tank or the like provided in an aircraft, a vehicle, an automobile, or the like, it is known to apply sealant (sealing agent) to the joint portion. In many cases, the sealant needs to be formed to satisfy a prescribed appearance quality (size and shape).

For this reason, there have been proposed examples in which various nozzles and jigs are used for sealant forming. A specific example of a sealant forming nozzle is disclosed in JP 2014-54606 A. When the nozzle according to JP 2014-54606 A is used, a nozzle main body, which is disposed so as to cover a target region where sealant is formed, is moved back and forth in the extending direction of the sealant, and a sealing agent is supplied along the target region from a discharge hole formed at the nozzle main body.

SUMMARY

However, since the sealing agent has a very high viscosity, when the nozzle main body is moved back and forth, the nozzle main body may disturb the surface of the sealing agent, resulting in unsatisfactory sealant formation. In addition, the shape of an end portion of the sealant is also required to comply with a standard, but sufficient measures for forming a terminal end portion are not described in the related art.

The present disclosure has been made to solve the problem described above, and an object thereof is to provide a sealant forming nozzle, a sealant forming apparatus, and a sealant forming method that can form sealant into an even better shape.

To solve the above-described problem, a sealant forming nozzle according to the present disclosure is a sealant forming nozzle that forms sealant by being moved along a target surface, and includes: a main body portion covering the target surface and forming a cavity, the cavity including an opening that opens only toward a rear side in a movement direction and a closing surface provided on a front side in the movement direction; and a discharge hole that is formed in the main body portion and guides a sealing material supplied from outside into the cavity. The closing surface extends so as to approach the target surface toward the front side in the movement direction in a cross-sectional view in a direction orthogonal to the movement direction and along the target surface.

A sealant forming apparatus according to the present disclosure includes: the sealant forming nozzle described above; a supply portion that supplies the sealing material to the discharge hole; and a moving portion that moves the sealant forming nozzle in the movement direction.

A sealant forming method according to the present disclosure is a sealant forming method using the sealant forming nozzle described above, and includes: installing the sealant forming nozzle at the target surface; supplying the sealing material from the discharge hole to the cavity; moving the sealant forming nozzle in the movement direction while supplying the sealing material; and, after the sealing material is cured, separating the sealant forming nozzle from the sealant by further moving the sealant forming nozzle toward the front side in the movement direction.

According to the present disclosure, a sealant forming nozzle, a sealant forming apparatus, and a sealant forming method that can form sealant into an even better shape can be provided.

BRIEF DESCRIPTION OF DRAWINGS

The disclosure will be described with reference to the accompanying drawings, wherein like numbers reference like elements.

DESCRIPTION OF EMBODIMENTS

A sealant forming apparatus 1, a sealant forming nozzle 2, and a sealant forming method according to a first embodiment of the disclosure will be described below with reference to FIGS. 1 to 5.

Configuration of Sealant Forming Apparatus

Figure 1:
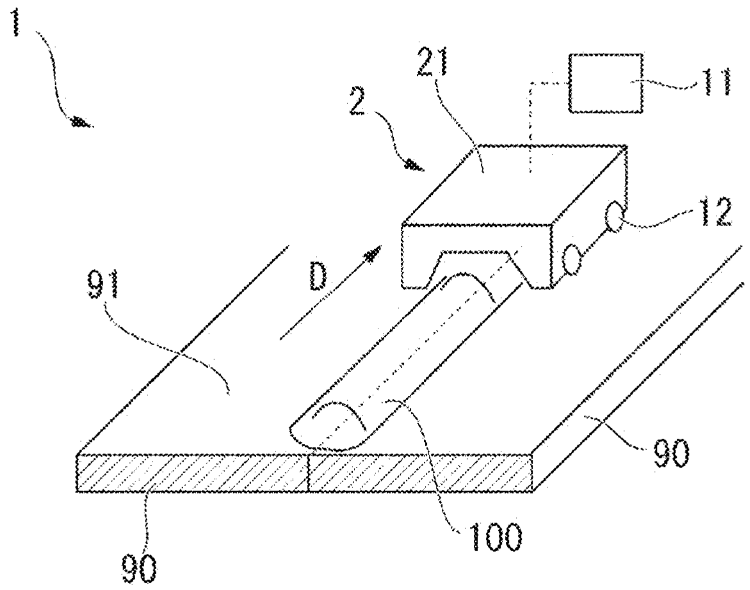
FIG. 1 is an overall view illustrating a configuration of a sealant forming apparatus according to an embodiment of the present disclosure.

The sealant forming apparatus 1 is suitably used to form sealant 100 for sealing a joint between members made of fiber-reinforced resin among structural members of wings of an aircraft, for example. Hereinafter, an example in which the sealant 100 is formed on a boundary between plate-like members 90 joined to each other as illustrated in FIG. 1 will be schematically described. A surface on one side in a plate thickness direction of the plate-like members 90 that includes the boundary between the plate-like members 90 is referred to as a "target surface 91".

The sealant forming apparatus 1 includes the sealant forming nozzle 2, a supply portion 11, and a moving portion 12. The sealant forming nozzle 2 supplies a gel-like sealing material onto the target surface 91. The sealing material is supplied from the supply portion 11 to the sealant forming nozzle 2. The moving portion 12 moves the sealant forming nozzle 2 in a direction along the joint between the plate-like members 90 (referred to as a movement direction D) to form the sealant 100. The moving portion 12 is, for example, wheels that are attached to the sealant forming nozzle 2 and roll on the target surface 91. By driving these wheels by a drive source (not illustrated), the sealant forming nozzle 2 can move on the target surface 91 in the movement direction D. The movement direction D may be in a curved shape or a zigzag shape depending on the direction of the joint.

Configuration of Sealant Forming Nozzle

Figure 2:
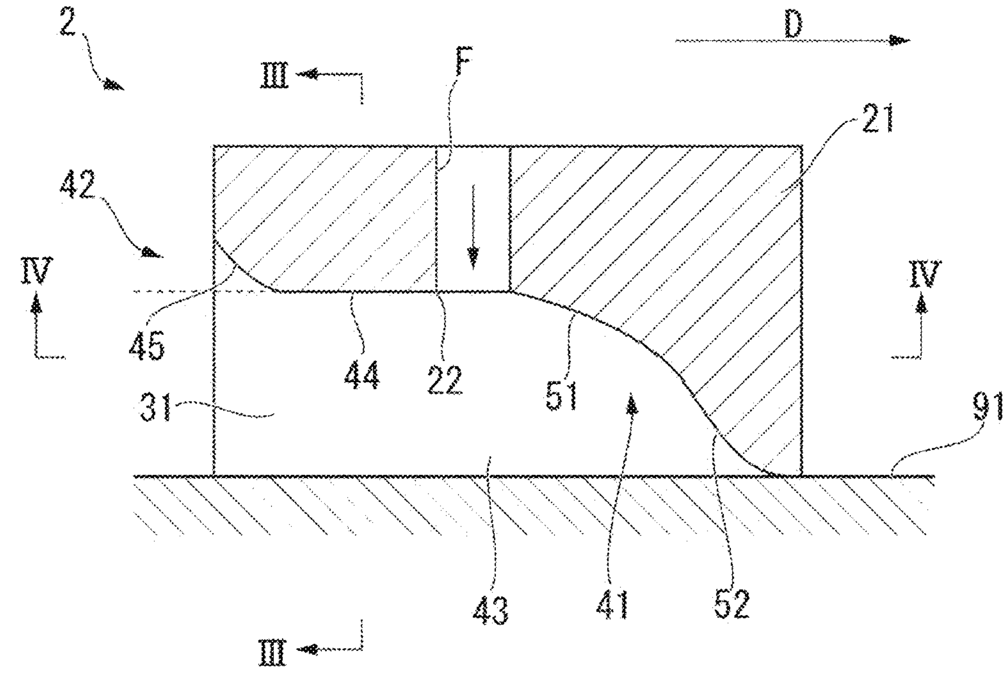
FIG. 2 is a cross-sectional view illustrating a configuration of a sealant forming nozzle according to the embodiment of the present disclosure.

As illustrated in FIG. 2, the sealant forming nozzle 2 includes a main body portion 21 and a discharge hole 22. The main body portion 21 is installed on the target surface 91 so as to cover the joint between the plate-like members 90. The main body portion 21 has a substantially rectangular parallelepiped outer shape. A cavity 31 is formed on the target surface 91 side of the main body portion 21. The cavity 31 is defined by a closing surface 41 located on a front side in the movement direction D, an opening 42 located on an opposite side to the closing surface 41, a pair of side surfaces 43 connecting the closing surface 41 and the opening 42 in the movement direction D, and a top surface 44 facing the target surface 91 in the plate thickness direction.

The top surface 44 extends in parallel to the target surface 91 having a flat shape. A surface on the front side in the movement direction D with respect to the top surface 44 constitutes the closing surface 41. The closing surface 41 is connected to an end edge of the top surface 44 on the front side, and spreads so as to approach the target surface 91 toward the front side. More specifically, the closing surface 41 includes a first surface 51 and a second surface 52. The first surface 51 has a curved surface shape that is convex in a direction away from the target surface 91 while approaching the target surface 91 side from the end edge of the top surface 44 on the front side toward the front side. The second surface 52 has a curved surface shape that is convex toward the target surface 91 side while approaching the target surface 91 from an end edge of the first surface 51 on the front side toward the front side. That is, there is an inflection point between the first surface 51 and the second surface 52. As an example, the position of the inflection point in a height direction is about ½ of a height dimension from the target surface 91 to the top surface 44. An end edge of the second surface 52 on the front side extends so as to come into contact with the target surface 91. That is, only a slight gap is formed between the end edge of the second surface 52 on the front side and the target surface 91.

The opening 42 opens toward a rear side in the movement direction D in the cavity 31. The opening 42 is defined by the pair of side surfaces 43 and a forming surface 45. The forming surface 45 extends in a direction away from the target surface 91 from an end edge of the top surface 44 on the rear side toward the rear side. The forming surface 45 has a curved surface shape that is convex toward the target surface 91 side. In addition, the top surface 44 and the forming surface 45 are continuous with each other without a step or the like formed therebetween.

Figure 3:
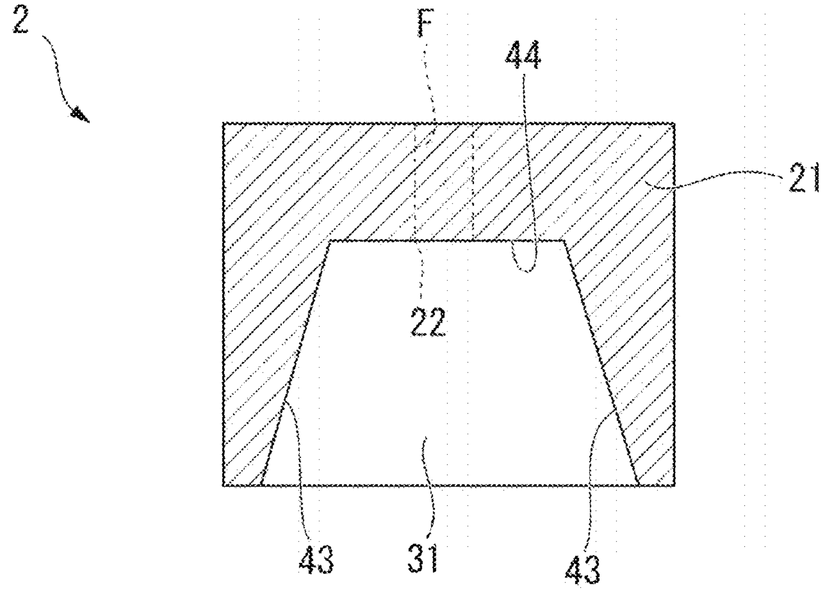
FIG. 3 is a cross-sectional view taken along line III-III in FIG. 2.

As illustrated in FIG. 3, the pair of side surfaces 43 extend from end edges of the top surface 44 toward the target surface 91 side. The distance between the pair of side surfaces 43 gradually increases toward the target surface 91 side. That is, the cavity 31 has a trapezoidal shape when viewed from the movement direction D. The cavity 31 opens toward the target surface 91.

Figure 4:
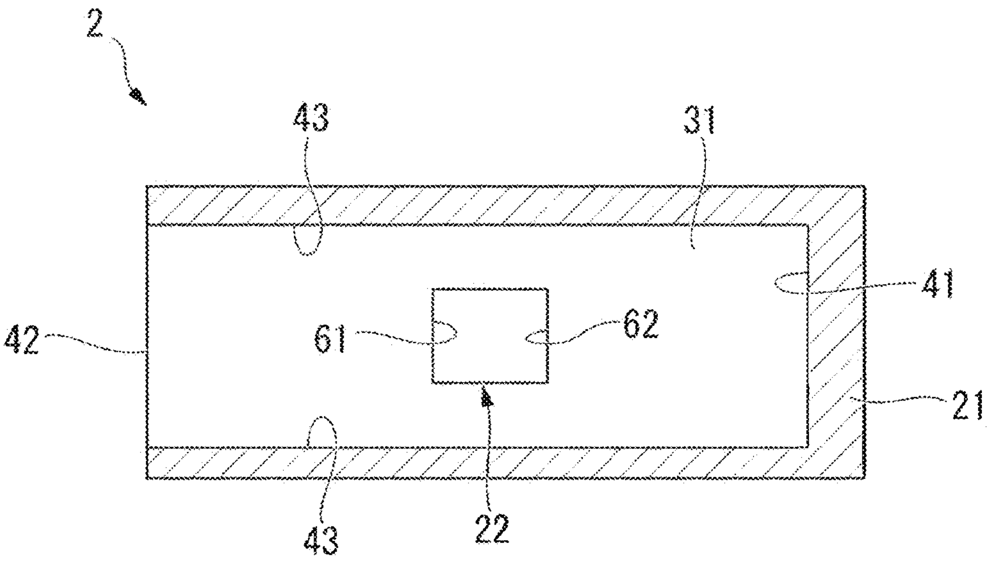
FIG. 4 is a cross-sectional view taken along line IV-IV in FIG. 2.

As illustrated in FIG. 2 or 4, the discharge hole 22 is formed at an intermediate position of the top surface 44 in the extending direction thereof. The discharge hole 22 is formed at a frontmost position of the top surface 44. The discharge hole 22 has a rectangular opening shape when viewed from a direction orthogonal to the target surface 91. That is, end edges of the discharge hole 22 on the rear side and the front side in the movement direction D (referred to as a first end edge 61 and a second end edge 62, respectively) extend linearly in a direction orthogonal to the movement direction D and along the target surface 91. When viewed from the direction orthogonal to the target surface 91, the discharge hole 22 opens at a central portion of the cavity 31 in the width direction thereof. The discharge hole 22 communicates with a supply flow path F for supplying the sealing material from the outside. The sealing material in a gel state before curing is filled into the cavity 31 through the supply flow path F and the discharge hole 22.

Sealant Forming Method

Figure 5:
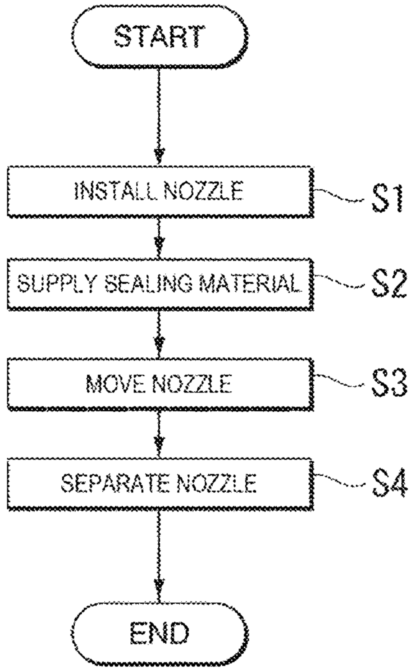
FIG. 5 is a flowchart showing respective steps of a sealant forming method according to the embodiment of the present disclosure.

Next, a method of forming the sealant 100 using the above-described sealant forming apparatus 1 will be described with reference to FIG. 5. As illustrated in the drawing, this method includes step S1 of installing the sealant forming nozzle 2, step S2 of supplying the sealing material, step S3 of moving the sealant forming nozzle 2, and step S4 of separating the sealant forming nozzle 2 from the sealant 100.

In step S1, the sealant forming nozzle 2 is installed on the target surface 91 at which a joint between the plate-like members 90 or the like is formed. At this time, it is desirable that the extending direction of the joint and the movement direction D of the sealant forming nozzle 2 coincide with each other. In addition, the sealant forming nozzle 2 is arranged at the beginning of the joint. In step S2, the sealing material is supplied into the cavity 31. After the sealing material is filled into the cavity 31, in step S3, the sealant forming nozzle 2 is moved in the movement direction D along the joint. As a result, the sealing material raised by the height of the cavity 31 (i.e., the distance between the top surface 44 and the target surface 91) is formed on the target surface 91 so as to cover the joint. In this step S3, the sealant forming nozzle 2 may be moved not only toward the front side, but also moved slightly toward the rear side in the movement direction D. Then, the sealant forming nozzle 2 is left to stand until the sealing material is cured. After the sealing material is cured to form the sealant 100, the sealant forming nozzle 2 is pulled to the front side in the movement direction D so as to be separated from the sealant 100. At this time, an excess portion of the sealant 100 remaining in the above-described supply flow path F is torn off by pulling the sealant forming nozzle 2 and removed from the main body of the sealant 100. In this manner, each step of the sealant forming method is completed.

Operational Effects

A predetermined quality standard is set for the sealant 100 used in an aircraft or the like as described above. This type of standard requires that a terminal end portion of the sealant 100 shall not be turned up and that an uneven rise of the sealing material shall not be formed in the middle of the sealant 100 in the extending direction thereof. However, since the sealing material has a very high viscosity, in the case of an apparatus of the related art, when the nozzle is moved back and forth in the movement direction D, an end edge of the opening 42 may disturb the surface of the sealing material, resulting in the above-described uneven rise or unsatisfactory sealant formation. In addition, the shape of the terminal end portion of the sealant 100 is also required to comply with the standard. However, sufficient measures against unsatisfactory sealant formation at the terminal end portion have not been described in the related art. For this reason, in the present embodiment, each configuration as described above is adopted.

According to the above-described configuration, the closing surface 41 extends so as to approach the target surface 91 toward the front side in the movement direction D. Thus, the shape of the terminal end portion of the sealant 100 can be formed into a gentle slope shape corresponding to the closing surface 41. That is, at the terminal end portion, the sealant 100 adheres tightly to the target surface 91 while forming a thin film on the target surface 91. Accordingly, the sealant 100 having a good shape that complies with a predetermined standard regarding the sealant 100 can be obtained.

Further, according to the above-described configuration, a portion of the closing surface 41 on the target surface 91 side is curved in a direction away from the target surface 91 toward the front side. Accordingly, a lower portion of the slope shape of the terminal end portion of the sealant 100 can be formed into a curved surface shape that spreads so as to gradually become thinner along the target surface 91. Thus, the adhesion between the sealant 100 and the target surface 91 can be further enhanced. As a result, the possibility of the occurrence of non-compliance of the sealant 100 can be further reduced.

According to the above-described configuration, the forming surface 45 extends away from the target surface 91 toward the rear side. Accordingly, when the main body portion 21 is moved to the rear side in the movement direction D, the forming surface 45 moves so as to sweep the uncured sealing material that is already filled on the target surface 91. Thus, the forming surface 45 is less likely to disturb the shape of the sealing material on the rear side. Therefore, uneven filling (uneven rise) of the sealing material can be avoided, and the shape of the sealant 100 can be more satisfactorily maintained. As a result, the compliance with the standard can be enhanced and the yield ratio of final products can be further improved.

In addition, according to the above-described configuration, since the forming surface 45 has a curved surface shape that is convex in a direction toward the target surface 91, the forming surface 45 is less likely to interfere with the sealing material on the rear side. Thus, the possibility of disturbing the shape of the uncured sealing material can be further reduced. Therefore, uneven filling of the sealing material can be avoided, and the shape of the sealant 100 can be still more satisfactorily maintained.

Here, after the filled sealing material is cured, the main body portion 21 needs to be separated from the cured sealing material (the sealant 100) by further moving the main body portion 21 to the front side in the movement direction D. At this time, an excess portion of the sealant 100 remaining in the above-described supply flow path F is torn off by pulling the sealant forming nozzle 2 and removed from the main body of the sealant 100 that is desired to be left. Since the end edge of the discharge hole 22 on the rear side is linear, a shearing force can be evenly applied from the rear side in the movement direction D to the excess portion of the sealant 100 extending from the discharge hole 22 toward the outside. Thus, the excess portion can be smoothly cut off immediately above (at the root of) the discharge hole 22. Accordingly, the excessive portion is less likely to remain on the surface of the sealant 100 after formation. As a result, the sealant 100 having a good shape that complies with the predetermined standard can be more easily obtained. On the other hand, for example, when the discharge hole 22 has a circular shape, a sufficient shearing force cannot be applied to the excess portion, and there is a possibility that unnecessary burrs remain on the surface of the sealant 100. According the above-described configuration, such a possibility can be significantly reduced.

According to the above-described configuration, since the discharge hole 22 has a rectangular shape, the sealing material can be continuously supplied evenly over the entire region inside the cavity 31. As a result, unsatisfactory formation of the sealant 100 due to the presence of air bubbles or the like can be avoided.

Further, according to the above-described configuration, by moving the sealant forming nozzle 2 in the movement direction D with the moving portion 12, the sealant 100 having a good shape can be autonomously and stably formed. This is advantageous as compared with manual forming especially when the sealant 100 needs to be formed in a narrow region.

According to the above-described method of forming the sealant 100, the sealant 100 having a good shape can be stably formed by moving the sealant forming nozzle 2 in the movement direction D. In particular, even when the moving portion 12 is not used, the filling amount and the shape of the sealing material can be checked by visual observation or the like while manually moving the sealant forming nozzle 2, and thus the sealant 100 having a more precise and excellent shape can be formed. As a result, the compliance rate of the sealant 100 can be improved, and the yield ratio of final products can be further improved.

OTHER EMBODIMENTS

An embodiment according to the present disclosure has been described in detail with reference to the drawings. However, the specific configuration of the present disclosure is not limited to this embodiment. Design change without departing from the main gist of the present disclosure or the like is also included.

For example, in the above-described embodiment, the plate-like member 90 has been described as a schematic example of a target object on which the sealant 100 is formed. However, the target object is not limited thereto. Other examples include a case in which the sealant 100 is formed at a joint where a stringer of an aircraft wing is joined to a skin. In addition, the above-described apparatus and the above-described method can be applied to any transportation machinery such as an automobile or a ship or any industrial machinery in which the sealant 100 needs to be formed. Further, the material of the target surface 91 on which the sealant 100 is formed is not limited to the fiber-reinforced resin, and may be another resin or a metal material. Furthermore, even when a step is formed along a joint on the target surface 91, the above-described apparatus and the above-described method can be suitably used.

Figure 6:
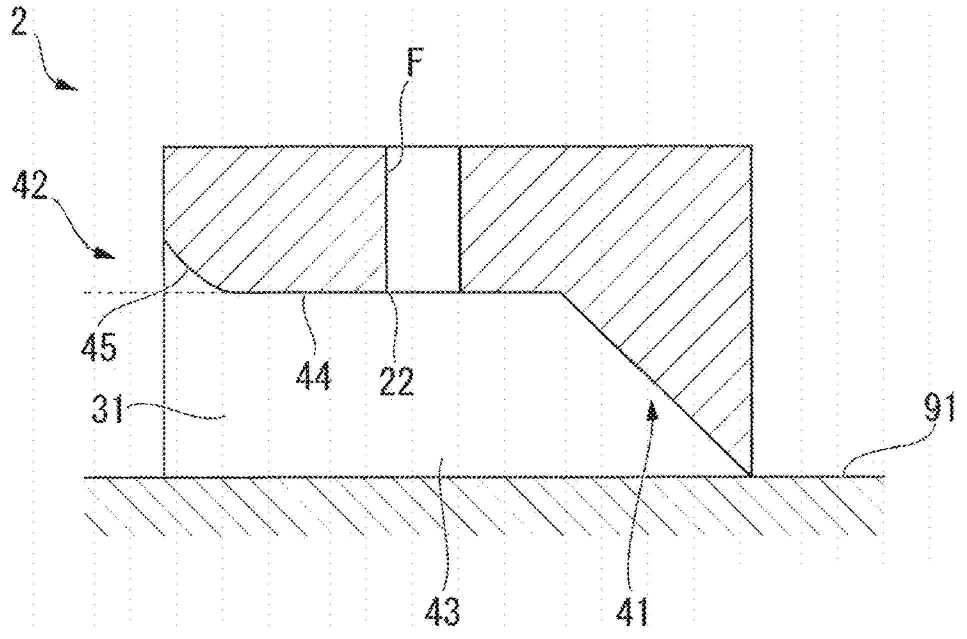
FIG. 6 is a cross-sectional view illustrating a first modification example of the sealant forming nozzle according to the embodiment of the present disclosure.

Various changes and modifications can also be made to the configuration of the above-described nozzle for forming the sealant 100. As illustrated in FIG. 6 as a modification example, the closing surface 41 may have a flat surface shape instead of a curved surface shape. More specifically, this closing surface 41 extends so as to approach the target surface 91 toward the front side in the movement direction D. According to such a configuration, since the cost and time required for processing the curved surface of the closing surface 41 can be reduced, the manufacturing cost and the maintenance cost of the apparatus can be reduced. Similarly, the forming surface 45 may extend in a planar shape in a direction away from the target surface 91 toward the rear side in the movement direction D. With this configuration as well, the cost and time required for processing the curved surface can be reduced, and thus the manufacturing cost and the maintenance cost of the apparatus can be reduced.

Figure 7:
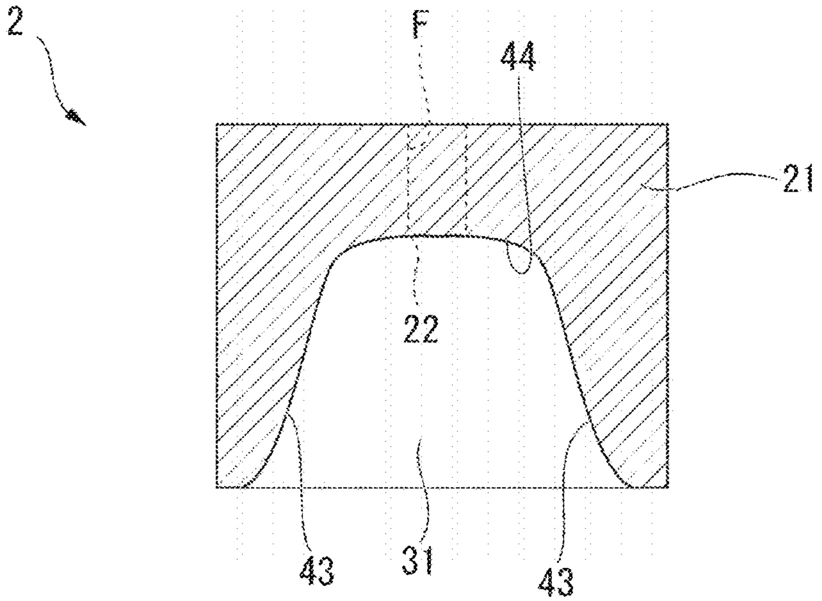
FIG. 7 is a cross-sectional view illustrating a second modification example of the sealant forming nozzle according to the embodiment of the present disclosure, and is a cross-sectional view corresponding to a line III-III in FIG. 2.

As illustrated in FIG. 7, the pair of side surfaces 43 may have a curved surface shape that is convex in a direction in which the pair of side surfaces 43 approach each other. In that case, the end edges of the sealant 100 in the width direction thereof tightly adhere to the target surface 91 in a gentle slope shape similarly to the terminal end portion. This can further improve the adhesion between the sealant 100 and the target surface 91. In addition, the compliance with the standard can be also enhanced.

Figure 8:
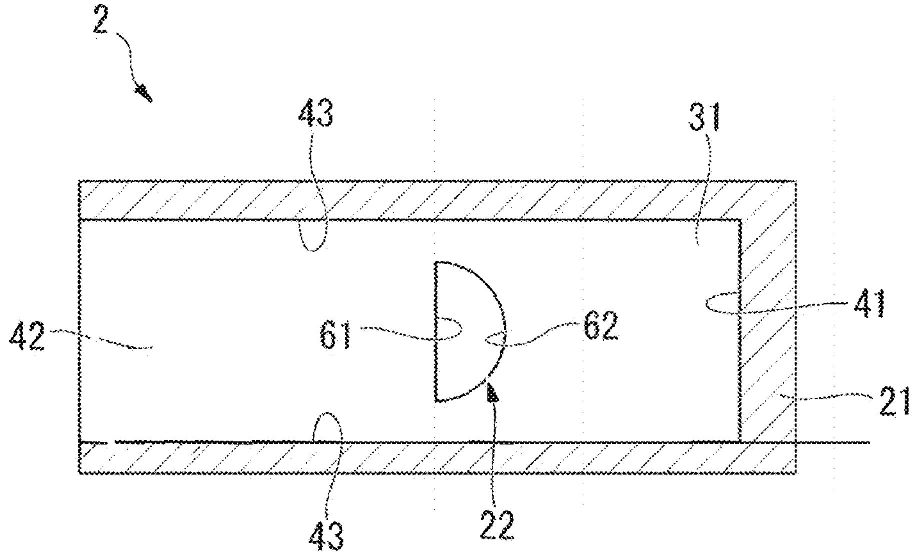
FIG. 8 is a view illustrating a first modification example of a discharge hole of the sealant forming nozzle according to the embodiment of the present disclosure.
Figure 9:
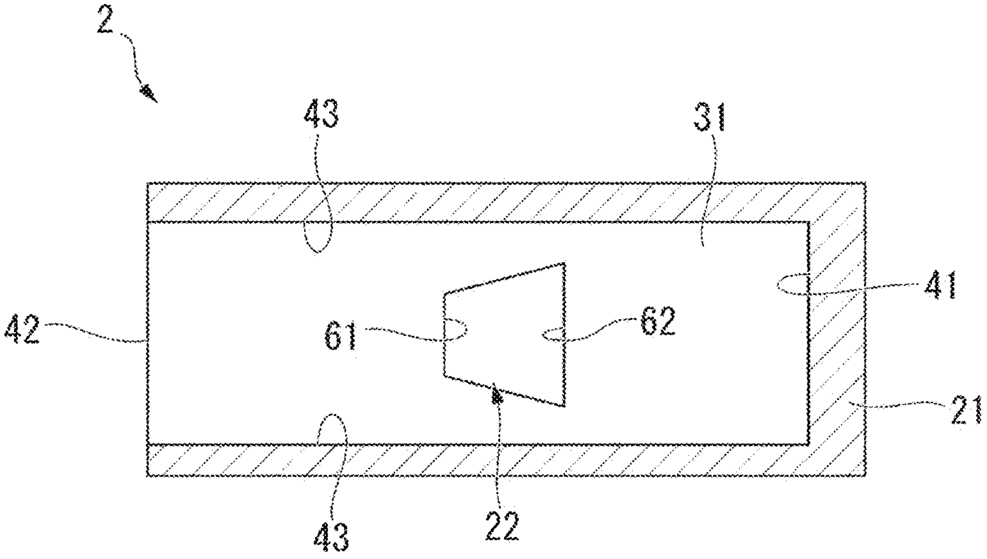
FIG. 9 is a view illustrating a second modification example of the discharge hole of the sealant forming nozzle according to the embodiment of the present disclosure.

Further, the shape of the discharge hole 22 is not limited to the above-described rectangular shape. As illustrated in FIG. 8, the end edge (the first end edge 61) on the rear side in the movement direction D may have a linear shape and the end edge (the second end edge 62) on the front side may have an arc shape. That is, only with the first end edge 61 having a linear shape, the above-described excess portion of the sealant 100 can be easily cut. Thus, the shape of the second end edge 62 may be appropriately changed depending on a design or a specification. In addition, as illustrated in FIG. 9, the discharge hole 22 may have a trapezoidal shape. In that case, it is desirable that the end edge (the second end edge 62) on the front side in the movement direction D is longer than the end edge (the first end edge 61) on the rear side. According to this configuration, since a larger amount of the sealing material can be supplied to a region on the front side in the movement direction D close to the terminal end portion, the possibility of unsatisfactory sealant formation at the terminal end portion can be further reduced. As a result, the quality and the yield ratio of final products can be further improved.

The aspect of the moving portion 12 is not limited to the above-described embodiment, and the position and the number of wheels can be appropriately changed depending on a design and a specification. Further, a crawler or a belt-like driving mechanism may be provided instead of the wheels. With any of these configurations, the same effects as those described above can be achieved.

SUPPLEMENTARY NOTES

Provision of the sealant forming nozzle 2, the sealant forming apparatus 1, and the sealant forming method that can form the sealant 100 described in each embodiment into a more favorable shape can be grasped as follows, for example.

(1) A sealant forming nozzle 2 according to a first aspect is a sealant forming nozzle 2 that forms sealant 100 by being moved along a target surface 91, and includes: a main body portion 21 covering the target surface 91 and forming a cavity 31, the cavity 31 including an opening 42 that opens only toward a rear side in a movement direction D and a closing surface 41 provided on a front side in the movement direction D; and a discharge hole 22 that is formed in the main body portion 21 and guides a sealing material supplied from outside into the cavity 31. The closing surface 41 extends so as to approach the target surface 91 toward the front side in the movement direction D in a cross-sectional view in a direction orthogonal to the movement direction D and along the target surface 91.

According to the above-described configuration, the closing surface 41 extends so as to approach the target surface 91 toward the front side in the movement direction D. Thus, the shape of the terminal end portion of the sealant 100 can be formed into a gentle slope shape corresponding to the closing surface 41. Accordingly, the sealant 100 having a good shape that complies with a predetermined standard regarding the sealant 100 can be obtained.

(2) A sealant forming nozzle 2 according to a second aspect is the sealant forming nozzle 2 of (1), wherein a portion of the closing surface 41 on the target surface 91 side is curved in a direction away from the target surface 91 toward the front side in the movement direction D.

According to the above-described configuration, a portion of the closing surface 41 on the target surface 91 side is curved in a direction away from the target surface 91 toward the front side. Accordingly, a lower portion of the slope shape of the terminal end portion of the sealant 100 can be formed into a curved surface shape that spreads so as to gradually become thinner along the target surface 91. Thus, the adhesion between the sealant 100 and the target surface 91 can be further enhanced.

(3) A sealant forming nozzle 2 according to a third aspect is the sealant forming nozzle 2 of (1) or (2), wherein a forming surface 45, which is an end edge of the opening 42 on a side opposite to the target surface 91, extends away from the target surface 91 toward the rear side in the movement direction D in a cross-sectional view in a direction orthogonal to the movement direction D and along the target surface 91.

According to the above-described configuration, the forming surface 45 extends away from the target surface 91 toward the rear side. Accordingly, when the main body portion 21 is moved to the rear side in the movement direction D, the forming surface 45 moves so as to sweep the uncured sealing material that is already filled on the target surface 91. Thus, the forming surface 45 is less likely to disturb the shape of the sealing material on the rear side. Therefore, uneven filling of the sealing material can be avoided, and the shape of the sealant 100 can be more satisfactorily maintained.

(4) A sealant forming nozzle 2 according to a fourth aspect is the sealant forming nozzle 2 of (3), wherein the forming surface 45 has a curved surface shape that is convex in a direction toward the target surface 91.

According to the above-described configuration, since the forming surface 45 has a curved surface shape that is convex in a direction toward the target surface 91, the forming surface 45 is less likely to interfere with the sealing material on the rear side. Thus, the possibility of disturbing the shape of the uncured sealing material can be further reduced. Therefore, uneven filling of the sealing material can be avoided, and the shape of the sealant 100 can be more satisfactorily maintained.

(5) A sealant forming nozzle 2 according to a fifth aspect is the sealant forming nozzle 2 according to any one of (1) to (4), wherein an end edge of the discharge hole 22 on the rear side in the movement direction D extends linearly in a direction orthogonal to the movement direction D and along the target surface 91.

Here, after the filled sealing material is cured, the main body portion 21 needs to be separated from the cured sealing material (the sealant 100) by further moving the main body portion 21 to the front side in the movement direction D. Since the end edge of the discharge hole 22 on the rear side is linear, a shearing force can be evenly applied from the rear side in the movement direction D to the excess portion of the sealant 100 extending from the discharge hole 22 toward the outside. Thus, the excess portion can be smoothly cut off immediately above (at the root of) the discharge hole 22. Accordingly, the excessive portion is less likely to remain on the surface of the sealant 100 after formation. As a result, the sealant 100 having a good shape that complies with a predetermined standard can be easily obtained.

(6) A sealant forming nozzle 2 according to a sixth aspect is the sealant forming nozzle 2 of (5), wherein the discharge hole 22 has a rectangular shape when viewed from a direction orthogonal to the target surface 91.

According to the above-described configuration, since the discharge hole 22 has a rectangular shape, the sealing material can be continuously supplied evenly over the entire region inside the cavity 31. As a result, unsatisfactory formation of the sealant 100 due to the presence of air bubbles or the like can be avoided.

(7) A sealant forming apparatus 1 according to a seventh aspect includes: the sealant forming nozzle 2 according to any one aspect out of (1) to (6); a supply portion 11 that supplies the sealing material to the discharge hole 22; and a moving portion 12 that moves the sealant forming nozzle 2 in the movement direction D.

According to the above-described configuration, by moving the sealant forming nozzle 2 in the movement direction D with the moving portion 12, the sealant 100 having a good shape can be autonomously and stably formed. This is advantageous as compared with manual forming especially when the sealant 100 needs to be formed in a narrow region.

(8) A sealant forming method according to an eighth aspect is a sealant forming method using the sealant forming nozzle 2 of any one aspect out of (1) to (6), and includes: installing the sealant forming nozzle 2 at the target surface 91; supplying the sealing material from the discharge hole 22 to the cavity 31; moving the sealant forming nozzle 2 in the movement direction D while supplying the sealing material; and, after the sealing material is cured, separating the sealant forming nozzle 2 from the sealant 100 by further moving the sealant forming nozzle 2 toward the front side in the movement direction D.

According to the above-described method, the sealant 100 having a good shape can be stably formed by moving the sealant forming nozzle 2 in the movement direction D. In particular, the filling amount and the shape of the sealing material can be checked by visual observation or the like while manually moving the sealant forming nozzle 2, and thus the sealant 100 having a more precise and excellent shape can be formed.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A sealant forming nozzle for forming sealant by being moved along a target surface, the sealant forming nozzle comprising:

a main body portion covering the target surface and forming a cavity, the cavity including an opening which opens only toward a rear side in a movement direction and a closing surface provided on a front side in the movement direction; and a discharge hole formed in the main body portion and configured to guide a sealing material supplied from outside into the cavity, the closing surface extending so as to approach the target surface toward the front side in the movement direction in a cross-sectional view in a direction orthogonal to the movement direction and along the target surface.

2. The sealant forming nozzle according to claim 1, wherein a portion of the closing surface on the target surface side is curved in a direction away from the target surface toward the front side in the movement direction.

3. The sealant forming nozzle according to claim 1, wherein a forming surface, which is an end edge of the opening on a side opposite to the target surface, extends away from the target surface toward the rear side in the movement direction in a cross-sectional view in a direction orthogonal to the movement direction and along the target surface.

4. The sealant forming nozzle according to claim 3, wherein the forming surface has a curved surface shape that is convex in a direction toward the target surface.

5. The sealant forming nozzle according to claim 1, wherein an end edge of the discharge hole on the rear side in the movement direction extends linearly in a direction orthogonal to the movement direction and along the target surface.

6. The sealant forming nozzle according to claim 5, wherein the discharge hole has a rectangular shape when viewed from a direction orthogonal to the target surface.

7. A sealant forming apparatus comprising:

the sealant forming nozzle described in claim 1;

a supply portion configured to supply the sealing material to the discharge hole; and a moving portion configured to move the sealant forming nozzle in the movement direction.

8. A sealant forming method using the sealant forming nozzle described in claim 1, the method comprising:

installing the sealant forming nozzle at the target surface;

supplying the sealing material from the discharge hole into the cavity;

moving the sealant forming nozzle in the movement direction while supplying the sealing material; and after the sealing material is cured, separating the sealant forming nozzle from the sealant by further moving the sealant forming nozzle toward the front side in the movement direction.

* * * * *